United States Patent [19]

Blanke

[11] 4,171,637
[45] Oct. 23, 1979

[54] FUEL BURNING EFFICIENCY DETERMINATION SYSTEM

[75] Inventor: John D. Blanke, Fullerton, Calif.

[73] Assignee: Beckman Instruments, Inc., Fullerton, Calif.

[21] Appl. No.: 933,248

[22] Filed: Aug. 14, 1978

[51] Int. Cl.² .......................................... G01M 15/00
[52] U.S. Cl. ..................................... 73/118; 364/431
[58] Field of Search ................. 73/118, 116, 23, 117, 73/117.3; 123/119 R; 364/431

[56] References Cited
U.S. PATENT DOCUMENTS 3,998,095  12/1976  Tinkham et al. ...................... 73/117
4,108,362  10/1978  Trussell et al. ..................... 73/116 X Primary Examiner—Jerry W. Myracle
Attorney, Agent, or Firm—Robert J. Steinmeyer; Paul R. Harder; Frank J. Kowalski

[57] ABSTRACT

An apparatus and method for determining fuel burning efficiency in articles which require hydrocarbon combustion for operation, such as noncatalytic converter equipped internal combustion engines, hot water heaters, furnaces and the like.

The invention includes a three gas analyzer which measures the amount of carbon monoxide, oxygen and hydrocarbon in the emissions of the exhaust system.

21 Claims, 6 Drawing Figures

FUEL BURNING EFFICIENCY DETERMINATION SYSTEM

BACKGROUND OF THE INVENTION

The present invention relates to an apparatus and method for determining fuel burning efficiency in hydrocarbon combustion articles by determining the carbon monoxide, oxygen and, in one embodiment, hydrocarbon emissions in the exhaust of the article being tested. The present invention is capable of indicating the probable cause of inefficiency, and providing the information necessary to correct defects, thereby increasing the efficiency of the article tested.

Hydrocarbon combustion articles can be the source of many undesirable gas emissions, automobile gasoline engines being of primary concern due to their extensive use in modern society, while hot water heaters and furnaces produce emissions which produce undesirable effects in the home. In attempting to diagnose hydrocarbon combustor faults by the use of tailpipe emissions on combustors such as automobile engines, it is difficult to isolate the causes of high hydrocarbons. High carbon monoxide emissions can be readily isolated to carburetion problems and prior art has developed many ways to isolate these difficulties. For high hydrocarbon emissions, prior art has indicated an approach which involves first sensing the presence of high hydrocarbons with a gas analyzer, then attempting to isolate whether high hydrocarbons are due to poor carburetion or to ignition failure with a scope tester. In high volume testing, as is required by several states concerned with automobile emissions such as the state of California, the testing agency is responsible not only for pass/fail testing, but also for diagnosis of the cause of the emission failure. The time required to connect and disconnect a scope type ignition tester requires additional man hours which increases testing cost. Therefore, accurate fault diagnosis is difficult in this program. Present art requires that the carburetor of the automobile engine be adjusted in order to isolate whether the fault is occurring in the carburetor or the ignition system. Furthermore, once the fault is determined to be in the carburetor or the ignition system, further isolation is necessary to isolate the faulty carburetor and/or ignition circuit. In addition, it is not currently possible to determine how out of balance a multibarrelled carburetor may be if it is the source of the high undesirable emissions.

In determining the efficiency of home hydrocarbon combustors such as hot water heaters, there is no simple method or apparatus in present prior art. After years of use, home hydrocarbon combustors may have lost their initial efficiency and this loss will remain unnoticed except for an increase in dirt sediments located near the home combustor.

SUMMARY OF THE INVENTION

In one embodiment, method and apparatus described herein permits the isolation of carburation from ignition problems, in combustors such as automobile engines, and also permits the analyst to determine the overall efficiency of the hydrocarbon combustor. The present invention includes a three gas analyzer, which measures the amount of carbon monoxide, oxygen, and hydrocarbon in the emissions of the exhaust system. The outputs of the gas analyzer are then processed through an electronic circuit which indicates whether the carbon monoxide and hydrocarbon emissions exceed prescribed safe limits. The electronic circuit is also capable of comparing the carbon monoxide emissions with the oxygen emission to determine whether the engine is running at an efficient ratio of air to fuel. The hydrocarbon combustor is run at two speeds, at idle speed for phase I and at an off idle speed such as 2,500 r.p.m. for phase II.

Excess hydrocarbon emissions at idle can be isolated to not only carburetor and/or ignition systems, but can be further isolated as to what type of misadjustment occurs in the idle circuit of the carburetor. The cause of hydrocarbon emissions at idle can be isolated without having to adjust the carburetor. Furthermore, the sum of carbon monoxide and oxygen gives an indication of the extent of imbalance in a multi-barrelled carburetor. A further determination as to whether the carbon monoxide content is greater or less than the oxygen content in the exhaust gives an immediate indication of the richness or leanness. How well balanced the carburetor is around a 15:1 air to fuel mixture, can also be examined through a carbon monoxide plus oxygen pass/fail determination. These indications disclose the overall efficiency of the engine.

The testing procedure is duplicated for phase II while the combustor is off idle or accelerated thereby eliminating the carburetor idle circuit from the engine. The information obtained from phase I testing influences the analysis of data obtained from phase II testing to facilitate accurate fault analysis.

Thus, the present invention permits isolation of carburetion or ignition faults causing excess undesirable emissions. Further isolation of the fault which occurs in the idle circuit is possible, thus saving the time required to adjust the carburetor before proceeding with a test.

The method and apparatus described herein also illustrates the use of a gas analyzer to determine the efficiency of any hydrocarbon combustor. By analyzing the carbon monoxide content and the oxygen content in the exhaust efficiency can be determined. The total carbon monoxide plus oxygen indicates the deviation from the most efficient air/fuel ratio. The greater of these two contents indicate whether the inefficiency is due to leanness or richness. In a second embodiment, a two gas analyzer is used to determine oxygen and carbon monoxide emissions in the exhaust of the hydrocarbon combustor. If the total carbon monoxide plus oxygen is high, the combustor is not operating efficiently. The carbon monoxide emissions are compared with the oxygen emissions to determine whether the hydrocarbon combustor is receiving a lean or rich mixture effecting its overall efficiency. Leanness or richness indicates how the air/fuel mixture of the hydrocarbon combustor must be adjusted to achieve maximum efficiency. Further advantages of the present invention will become readily apparent in the description of the preferred embodiment.

DESCRIPTION OF THE PREFERRED EMBODIMENT

Figure 1:
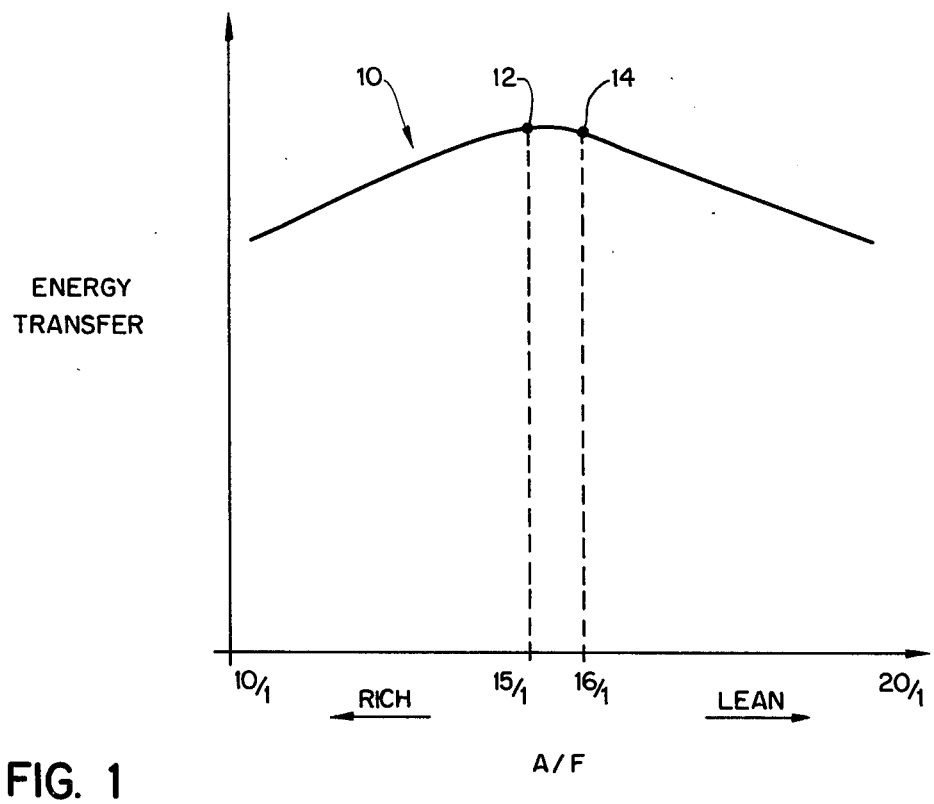
FIG. 1 is a graph illustrating combustor efficiency as a function of the air to fuel ratio of the combustor.

FIG. 1 illustrates an energy transfer or efficiency curve for any hydrocarbon combustor having air to fuel ratio for its X axis and increasing energy transfer or efficiency for its Y axis. A curve 10 illustrates the efficiency of any hydrocarbon combustor, such as a water heater or internal combustion engine, etc., as a function of the air to fuel ratio. It should be noted on energy efficiency curve 10 that a hydrocarbon combustor achieves its maximum efficiency between points 12 and 14 which corresponds to an air to fuel ratio of between 15:1 and 16:1. The energy transfer maximum occurs at some point above the ratio of 15:1 since below this ratio the fuel combustion process is not receiving enough oxygen for total combustion. The curve maximum occurs at some point below a ratio of 16:1 since above this ratio the increased supply of oxygen bearing air also provides an increased supply of heat conducting nitrogen gas.

Figure 2:
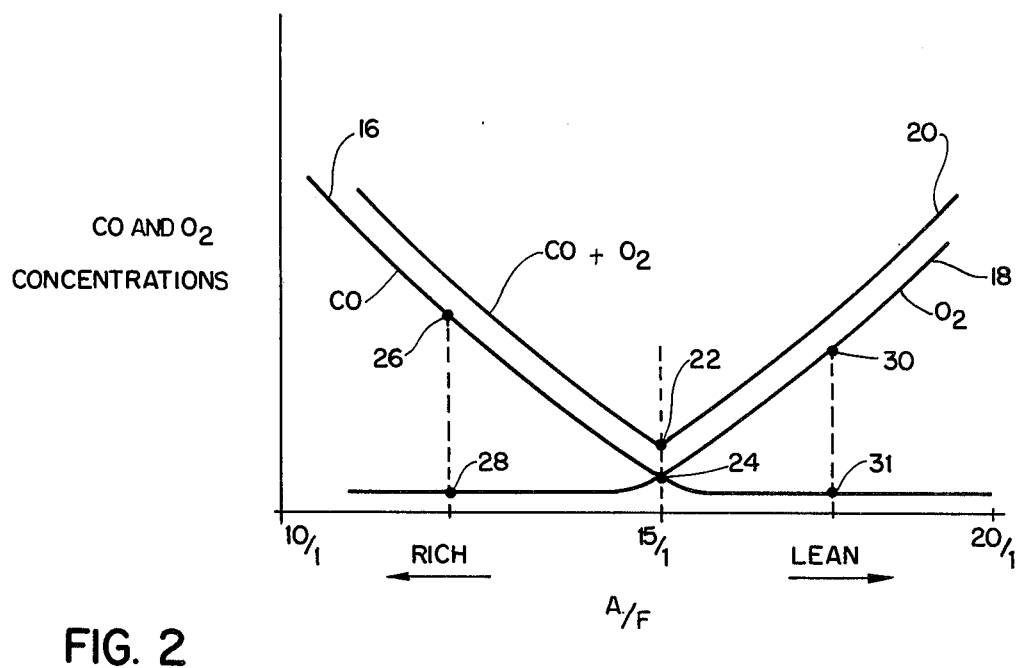
FIG. 2 is a graph illustrating carbon monoxide and oxygen concentration as a function of the air to fuel ratio of the combustor.

Referring now to FIG. 2, a curve 16 is shown illustrating the carbon monoxide concentration, a curve 18 is shown illustrating the oxygen concentration and a curve 20 is shown illustrating the total carbon monoxide plus oxygen concentrations for various air to fuel ratios in any hydrocarbon combustor. A point 22 depicts the minimum of the sum of carbon monoxide and oxygen which corresponds to an intersecting point 24 of the oxygen and carbon monoxide concentration curves 18 and 16 respectively. This point further corresponds to an air to fuel ratio of 15:1. As can be seen from viewing FIG. 1 and FIG. 2, the point for maximum energy transfer for the majority of hydrocarbon fuels occurs at air to fuel ratio slightly leaner than the point where the total carbon monoxide and oxygen emission is at its lowest.

For internal combustion engines, such as that in an automobile, FIG. 2 illustrates an exhaust gas oxygen and carbon monoxide concentrations vs. air/fuel ratio as would be present in a single barrelled carburetor engine. For two or more barrelled carburetors, the graphical representation would be similar although it is not easily shown in two dimensions. When an internal combustion engine is running in the rich mode, carbon monoxide exceeds oxygen as shown by a comparison of points 26 and 28. In the lean mode oxygen emissions exceed carbon monoxide emissions, as shown by a comparison of points 30 and 31. It is important to note that the sum of carbon monoxide and oxygen, as illustrated by curve 20, has its minimum value at the point where carbon monoxide equals oxygen at point 24 or point 22 on curve 20.

Figure 3:
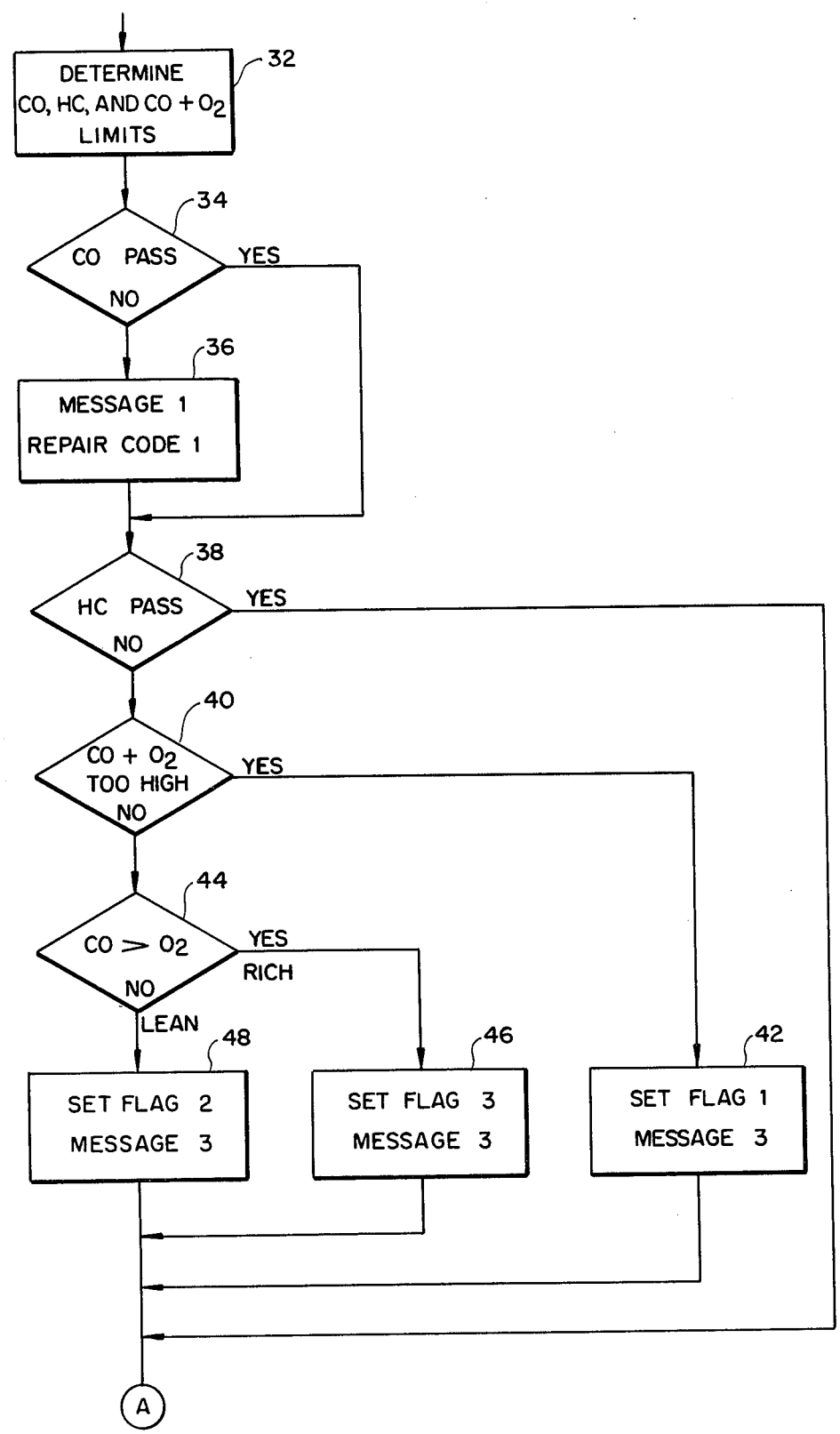
FIG. 3 and 3A comprise a block diagram illustrating the basic procedure of the present invention.
Figure 3A:
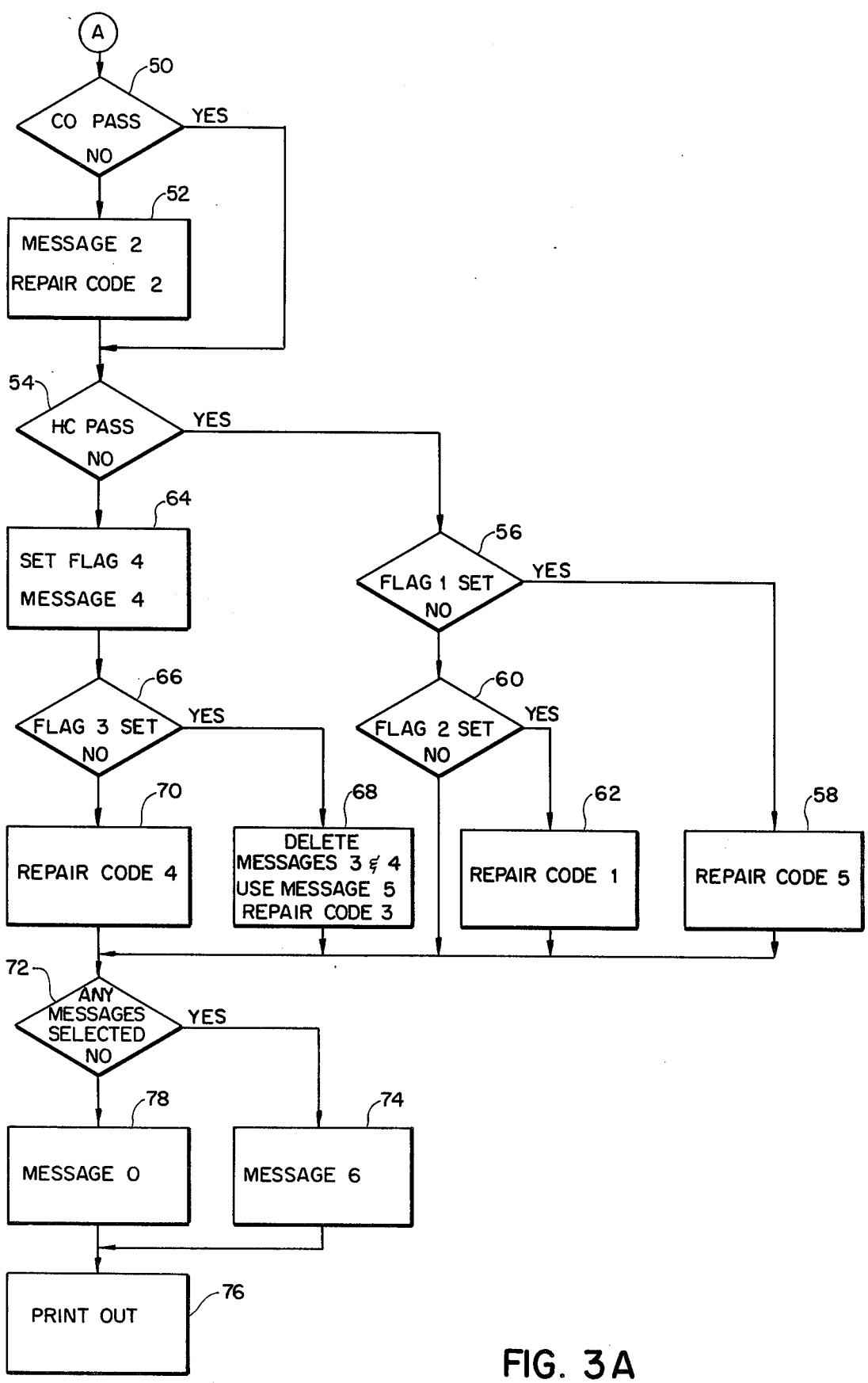

Referring now to FIGS. 3 and 3A, the basic procedure for performing the test associated with the present invention is shown in block form. The limits for hydrocarbon, carbon monoxide and carbon monoxide plus oxygen are set into the system which will take the form of a negative voltage to specified summing circuits which also receive the inputs from the various sensors. The test procedure is run in two phases, a first phase during which the hydrocarbon combustor is run at idle speed and a second phase during which the hydrocarbon combustor is run at an off idle speed, such as 2500 r.p.m. The first portion of each phase is to test the emissions in the exhaust of the hydrocarbon combustor for carbon monoxide emissions.

In the idle phase of the test, the sensed carbon monoxide emissions are compared with the predetermined maximum which is represented by one of the previously mentioned negative voltages. High carbon monoxide emissions are caused by an improper air to fuel mixture as illustrated in FIG. 2. The fuel supply must be adjusted to correct the problem resulting in high carbon monoxide emissions. If this test is failed, information indicating high carbon monoxide emissions is stored. The test proceeds by comparing the hydrocarbon emissions with another predetermined maximum represented by a second negative voltage. High hydrocarbon emissions can be caused by either ignition or carburetor problems. If the hydrocarbon portion of the test is failed, the carbon monoxide and oxygen sensors produce information and set matrix flags which indicates the richness, leanness or imbalance of the air to fuel ratio being fed to the internal combustor. The procedure begins by testing the carburetor balance through a measurement of the total oxygen plus carbon monoxide emissions. If this total exceeds another predetermined maximum, the problem source is probable carburetor imbalance. If the total carbon monoxide plus oxygen is less than this predetermined maximum, the carburetor is probably balanced and the procedure further isolates the problem through a comparison of oxygen emissions and carbon monoxide emissions. The carburetor is probably the source of the problem when the engine fails the hydrocarbon portion of the test while the oxygen emissions are greater than the carbon monoxide emissions or the engine is operating with a lean air to fuel ratio. The ignition system and not the carburetor is probably the source of the problem when three conditions are present. First, the hydrocarbon emissions are greater than the predetermined maximum; second, the total of carbon monoxide emissions plus oxygen emissions do not exceed a preselected level, and third, the carbon monoxide emissions are greater than the oxygen emissions, or the air to fuel ratio is too rich.

The off idle phase of the test begins with a comparison of carbon monoxide emissions with an additional predetermined maximum. The predetermined maximum against which the carbon monoxide emissions are compared during the off idle phase of the test is preferably twice the predetermined maximum for carbon monoxide emissions of the idle phase of the test. If the engine fails this test, the problem of carburetor richness or high carbon monoxide emissions requires that the carburetor be overhauled. Failure of this portion produces information which is retained by the display output for a final output. The test proceeds with a comparison of the hydrocarbon emissions with another predetermined maximum. This predetermined maximum is preferably twice the hydrocarbon emission maximum of the idle phase of the test. The information gathered during the idle phase of the test is retained and used to determined whether any problems or faults which might exist are generated by the ignition system or the carburetor. If the hydrocarbon emissions are below the maximum limit, the information gathered during the idle phase of the test is checked. If the carbon monoxide plus oxygen emissions of the idle phase were high and the engine failed the hydrocarbon portion of the idle phase of the test, the problem initially uncovered is due to carburetor imbalance. If the engine is running lean, that is, oxygen emissions greater than carbon monoxide emissions, while the total carbon monoxide plus oxygen is below a preselected maximum and the engine failed the hydrocarbon portion of the idle phase of the test, again, the problem is in the air to fuel mixture in the carburetor.

Failure of the hydrocarbon portion of the off idle phase of the test or emissions greater than the maximum limit is caused by probable ignition problems. The idle phase is again checked to isolate the problem. If during the idle phase the carbon monoxide emissions were greater than the oxygen emissions, while their total was below a preselected level and the hydrocarbon portion was failed, a tune up is needed. If the foregoing three elements did not occur, then further diagnostic steps outside the scope of the present invention are necessary. Listed below are the messages, repair codes and matrix flags which may be activated as responses to the performance of the engine during various portions of both phases of the test.

DIAGNOSTIC MEASURES

| Message # | Message |
|---|---|
| 0 | Passed, no repair required |
| 1 | CO failed at idle |
| 2 | CO failed at off idle |
| 3 | HC failed at idle |
| 4 | HC failed off idle |
| 5 | HC failure at both speeds |
| 6 | Failed testing, use repair procedures |

MATRIX FLAGS

| Flag # | Flag Message |
|---|---|
| 1 | Probable carburetor imbalance |
| 2 | Probable excess leanness at idle |
| 3 | Probable ignition failure at idle |
| 4 | Probable ignition failure off idle |

REPAIR CODES

| Code # | Repair Action |
|---|---|
| 1 | Adjust idle air to fuel mixture screws |
| 2 | Carburetor overhall required |
| 3 | Obtain engine tune up |
| 4 | Use further diagnostic steps to isolate problem |
| 5 | Balance carburetor |

For efficiency determination of hydrocarbon combustors other than automobile engines, analysis of only two gases, carbon monoxide and oxygen, is necessary. The total carbon monoxide plus oxygen emissions are compared with a predetermined maximum to determine whether or not the combustor is operating efficiently. If the total is greater than this predetermined maximum, further analysis of the carbon monoxide and oxygen is necessary to determine which is greater. If the carbon monoxide emissions are greater, the combustor is being operated at a rich air to fuel ratio, causing incomplete burning of the fuel. The fuel supply should be reduced with respect to the air supply (either by reducing the fuel supply or increasing the air supply). If the oxygen emissions are greater, the air to fuel ratio is too lean, causing an increased supply of heat conducting nitrogen to be fed to the combustor. The fuel supply should be increased with respect to the air supply (either by increasing the fuel supply or reducing the air supply).

Block 32 illustrates that portion of the entire test during which the carbon monoxide, hydrocarbon and oxygen plus carbon monoxide predetermined maximums are set. Block 34 indicates the first test of the exhaust where carbon monoxide is detected. If carbon monoxide is greater than a preselected maximum magnitude, block 36 is called into play which will call out message 1, indicating that the engine failed the carbon monoxide test at idle, along with repair code 1, requiring that the carburetor air to fuel ratio at idle must be adjusted, in display 94 when both phases of the testing are complete. High carbon monoxide emissions indicate engine operation at an air to fuel ratio above fifteen to one as illustrated in FIG. 2. After setting the required message and repair code or if the carbon monoxide is within the limits set in block 32, the test proceeds to block 38 where the exhaust hydrocarbons are tested. If the hydrocarbon emissions are below a second preselected maximum, the accumulation of information for the off idle phase, such as operation at 2,500 r.p.m., is commenced. If, in the idle phase, the hydrocarbon emissions are above this second predetermined maximum, information concerning the carbon monoxide plus oxygen is accumulated at block 40. If the carbon monoxide plus oxygen level exceeds a third predetermined maximum represented by a third negative voltage, flag 1 indicating probable carburetor imbalance is set and message 3 disclosing that the engine under test failed the HC at idle portion of the test is issued as illustrated by block 42. If the carbon monoxide plus oxygen is below this predetermined maximum, information of, as shown in block 44, the carbon monoxide level with respect to the oxygen level is gathered. The procedure illustrated in blocks 40 and 44 can be used on any hydrocarbon combustor to determine the efficiency of the combustor. Block 40 illustrates determination of the combustor efficiency by comparing the carbon monoxide plus oxygen emissions with a predetermined maximum. If the total oxygen plus carbon monoxide is greater than a maximum, the engine is operating inefficiently. Through a determination of which emissions are greater, oxygen or carbon monoxide, as illustrated at block 44, whether the combustor is operating lean or rich can be determined. If the oxygen emissions are greater, the combustor is operating too lean and heat conducting nitrogen is causing a loss in the combustor's heating potential. If the carbon monoxide emissions are greater, the combustor is operating too rich, resulting in incomplete burning of the fuel. In either case, the air to fuel ratio must be adjusted. If the ratio is too lean, either the fuel supply must be increased or the air supply must be decreased. If the ratio is too rich, either the fuel supply must be decreased or the air supply must be increased. If the carbon monoxide level is greater than the oxygen level, then as illustrated at block 46 flag 3 indicating a probable ignition failure at idle is set and message 3 disclosing failure in the HC portion of the idle phase of the test will be called out on output display 94 when the test is complete. If the oxygen concentration is greater than the carbon monoxide concentration, then as illustrated at block 48 flag 2 indicating probable excess leanness at idle is set and message 3 again disclosing failure in the hydrocarbon portion of the idle phase will be called out.

The engine r.p.m. is set at 2500 and the off idle phase of the test begins at block 50 with an analysis of the exhaust to determine carbon monoxide content. If the carbon monoxide emission level is greater than a fourth predetermined magnitude, message 2, disclosing that the engine failed the CO emission portion of the off idle phase of the test, and repair code 2, requiring an overhaul of the carburetor, will be called out as illustrated in block 52. Information regarding hydrocarbon emissions is gathered as shown in block 54.

If the hydrocarbon emissions are below a fifth predetermined maximum, then two items are checked in order. First, whether flag 1, probable carburetor imbalance, was set in the previous tests is considered. If it were, repair code 5 indicating a need to balance the carburetor will be called out and the analysis goes to its final phase. If it were not set, then whether flag 2, probable excess leanness at idle, had been set is considered as illustrated in block 60. If it were, then repair code 1 indicating that the idle air to fuel ratio must be adjusted will be called out as shown in blcok 62. If flag 2 were not set, then the test proceeds to the final analysis.

If the hydrocarbon emissions exceed the fifth predetermined maximum, then flag 4, probable ignition failure during off idle, is set and message 4 disclosing HC failure during the off idle phase will be called out as illustrated in blcok 64. The analysis then proceeds to check to see if flag 3, indicating a probable ignition failure at idle, had been set as illustrated in block 66. If flag 3 were set, then messages 3 indicating failure at idle and 4 indicating failure off idle are eliminated and message 5 indicating HC failure during both phases of the test is issued along with repair code 3, requiring an engine tune up, as illustrated in block 68. If flag 3 were not set, then repair code 4, requiring further diagnostic steps outside the scope of the present invention to isolate the problem, is issued as shown in block 70.

At this point the final analysis is begun and whether any messages have been selected is determined. If messages had been selected, then message 6 disclosing a failure of testing with any indicated repair codes is issued and printed out as illustrated in blocks 74 and 76. If no messages had been selected, then message 0 indicating a complete pass is issued as shown in block 78 is printed out at block 76.

Figure 4:
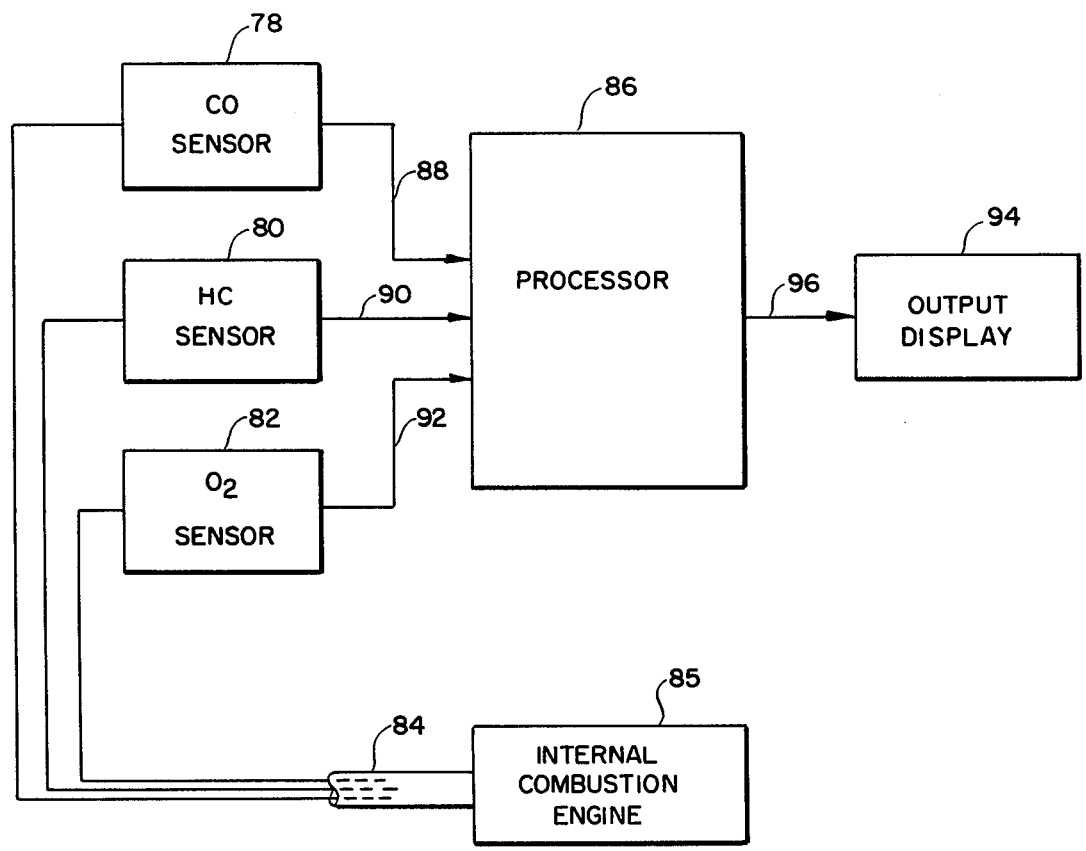
FIG. 4 is a block diagram of the apparatus of the present invention.

FIG. 4 illustrates a basic block diagram for the accomplishment of the procedure of FIG. 3. A carbon monoxide sensor 78, a hydrocarbon sensor 80 and an oxygen sensor 82 are connected to an exhaust 84 of an internal combustion engine 85 and in turn are connected on their output side to a processor 86 through conductors 88, 90 and 92, respectively. Processor 86 is in turn connected to an output display 94 through a conductor 96. Output display 94 may be any visual or audio type of display such as a series of lights or alarm (not shown). However, the preferred embodiment describes the use of a cathode ray tube with associated circuitry.

Figure 5:
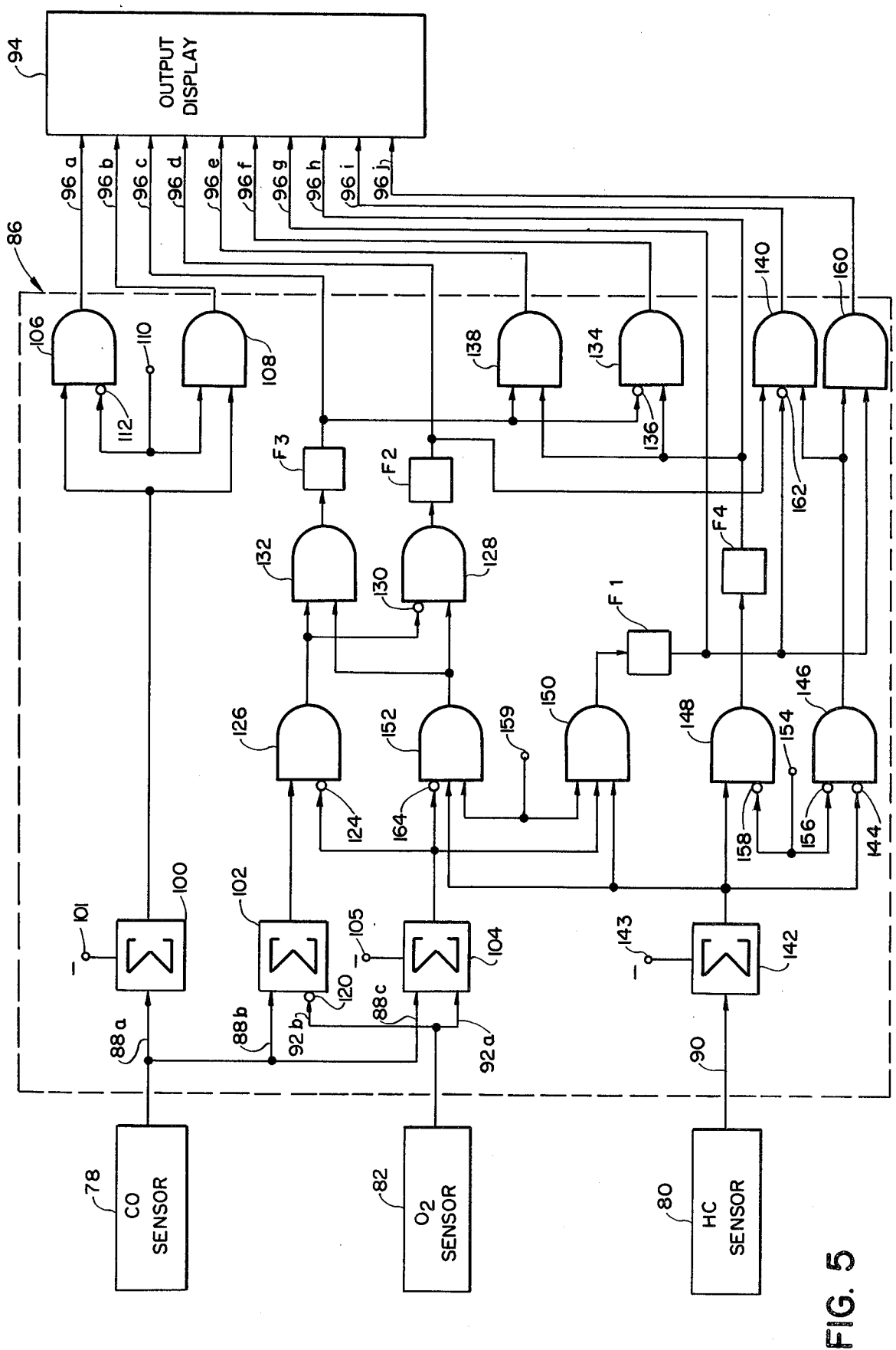
FIG. 5 is a block diagram of a processor of FIG. 4.

FIG. 5 illustrates a partial block, partial schematic diagram of a processor 86 of the preferred embodiment. Cross references to FIG. 3 are given throughout the detailed description of FIG. 5 to aid in analysis of the electronic circuit. Although processor 86 is shown as being comprised entirely of summing nodes, AND gates, latches and inverters, it is apparent to one skilled in the art that the same functions can be performed by OR gates, NOR gates and NAND gates in combination with AND gates and inverters and summing nodes, or through the use of a programmable or nonprogrammable microprocessor.

Carbon monoxide sensor 78 is connected through conductor 88a to summing circuit 100 which receives a negative input from node 101, through conductor 88b to summing circuit 102 and through conductor 88c to summing circuit 104 which receives a negative input from node 105. Comparator 100 is connected to AND gates 106 and 108 which also receive inputs from idle node 110 through inverter 112 for AND gate 106 and directly for AND gate 108. The outputs of AND gates 106 and 108 are fed to output display 94 through conductors 96a and 96b, respectively.

Oxygen sensor 82 is connected to inverter 120 and then to summing circuit 102 through conductor 92b and to summing circuit 104 through conductor 92a. Summing circuit 104, through inverter 124, and summing circuit 102 provide inputs to AND gate 126 which is in turn connected to the input side of AND gate 128 through inverter 130 and to AND gate 132. AND gate 132 in turn supplies a signal to the input to latch F3 which supplies an input to output display 94 through conductor 96c, to AND gate 134 through inverter 136, and to AND gate 138. AND gate 134 and AND gate 138 supply inputs to output display 94 through conductors 96f and 96e, respectively. AND gate 128 supplies a signal to latch F2 which supplies an input to AND gate 140 and to output display 94 through conductor 96d.

Hydrocarbon sensor 80 is connected through conductor 90 to summing circuit 142 which receives a negative input from node 143. Circuit 142 is connected to AND gate 146 through inverter 144, to AND gate 148, to AND gate 150 and to AND gate 152. AND gates 146 and 148 receive an additional input from idle node 154 through inverters 156 and 158, respectively while AND gates 150 and 152 receive an additional input from idle node 159. AND gate 146 supplies an input to AND gate 140 and to AND gate 160, both of whose outputs are fed into output display 94 through conductors 96i and 96j, respectively. AND gate 150 sets latch F1 which supplies an input to AND gate 140 through inverter 162 and to AND gate 160. The output of latch F1 also supplies a signal to output display 94 through conductor 96g. AND gate 148 supplies a signal to latch F4 which supplies an input for AND gate 134, for AND gate 138 and an input to output display 94 through conductor 96h. In addition to receiving an input from summing circuit 142, AND gate 152 also receives an input from summing node 104 through inverter 164. AND gate 152 in turn supplies one of the inputs for AND gate 128 and one of the inputs to AND gate 132.

In actual operation the circuit operates with a positive voltage being a logic true signal and a negative or zero voltage being a logic false signal. Nodes 101, 105 and 143 supply negative voltages representative of the permissible maximum levels of carbon monoxide, carbon monoxide plus oxygen, and hydrocarbon emissions respectively for the engine being tested. Idle nodes 110, 159 and 154 supply positive voltages or logical true signals when the engine is at idle and logical false signals otherwise.

Carbon monoxide sensor 78 detects the amount of carbon monoxide emissions in the exhaust and feeds this information to comparator 100 wherein it is combined with the negative voltage representative of a permissible amount of carbon monoxide emissions from node 101. If the carbon monoxide emissions are below the permissible level, a negative signal is fed from comparator 100 to AND gates 106 and 108 and no output is received by output display 94. If the emissions are above this predetermined maximum, a positive signal is fed to AND gate 108 which, during the first phase of the test, will receive a true signal from idle node 110 thus producing an output to display 94 through conductor 96b which calls up message 1, indicating that the engine failed CO testing at idle, and repair code 1 requiring that the idle air to fuel ratio be adjusted as illustrated in box 34 of FIG. 3.

The hydrocarbon emissions are sensed through sensor 80 and fed to summing circuit 142 through conductor 90 where this signal is combined with a negative signal representative of the acceptable limit of hydrocarbon emissions in the exhaust from node 143 (see box 38 of FIG. 3). When the hydrocarbon emissions are less than the acceptable limit as indicated by node 143, a negative output from summing circuit 142 produces a negative signal or a logical false in the idle phase of this test while an excessive hydrocarbon emission signal will produce true inputs to AND gate 152, 150 and 148. AND gate 150 receives an input from summing circuit 104 which indicates whether the carbon monoxide plus oxygen emissions exceed a predetermined amount. Summing circuit 104 determines this level by receiving an input from carbon monoxide sensor 78 and oxygen sensor 82 and combining these two signals with a negative input that is proportionate to a safe level of carbon monoxide plus oxygen from node 105 (box 40 of FIG. 3). Thus, if the hydrocarbon emissions are excessive and the carbon monoxide plus oxygen level is too high, AND gate 150 issues a signal to set latch F1 which issues a signal to output display 94 calling out message 3 when the final output is requested (box 42 of FIG. 3). The signal from summing node 104 is also fed to inverter 164 which feeds AND gate 152, thus AND gate 152 produces a true output if it receives a true input that hydrocarbon emissions are high and a true input from inverter 164 indicating that the CO plus $O_2$ level does not exceed a predetermined maximum (box 48 of FIG. 3).

The information from AND gate 152 is fed to AND gate 132 which receives an additional output from AND gate 126 indicative of whether the carbon monoxide exceeds oxygen or oxygen exceeds carbon monoxide (box 44 of FIG. 3). AND gate 126 receives information as to whether the oxygen plus carbon monoxide level is in excess through inverter 124 in the form of a true signal if carbon monoxide plus oxygen does not exceed the predetermined maximum level. AND gate 126 also receives information as to whether the oxygen level is higher than the carbon monoxide level or vice versa through summing circuit 102. Summing circuit 102 determines this information by receiving a positive signal indicative of the carbon monoxide level from carbon monoxide sensor 78 and a signal through inverter 120 of the oxygen level. If the oxygen level is less than the carbon monoxide level, a true signal will be issued by summing node 102; thus the output of AND gate 126 will be true if carbon monoxide plus oxygen are below a prescribed level and the carbon monoxide level is greater than the oxygen level. It should be noted that a minimum of circuitry is necessary to accomplish the functions of box 40 and box 44 of FIG. 3. As indicated previously, the functions of boxes 40 and 44 are the minimum necessary to provide a two gas hydrocarbon combustor efficiency test apparatus. The output of AND gate 132 is true when true inputs are received from AND gate 126 and 152 and message 3 will be indicated along with the setting of latch F3 (box 46 of FIG. 3). If the oxygen level is greater than the carbon monoxide level, a false signal will be produced by summing node 102 which in turn will produce a false output from AND gate 126. A false output is fed to inverter 130 converting it to a true signal. Thus, the output of AND gate 128 will be true and latch F2 will be set and flag 2 is set along with an indication of message 3 to output display 94 as indicated in box 48 of FIG. 3.

Phase 2 of the test begins with a test of the carbon monoxide level and again, carbon monoxide sensor 78 feeds a signal to comparator 100 indicative of the carbon monoxide emission level in the exhaust. If the carbon monoxide level is excessive, a true signal is fed to AND gate 106 which will also receive a true signal from inverter 112 having converted a false signal issued by idle node 110 into a true signal. The output of AND gate 106 will then be true and message 2 along with repair code 2, requiring that the carburetor richness off idle must be isolated, will be called up in output display 114 as indicated in block 52 of FIG. 3A. The hydrocarbon emissions are sensed through sensor 80 and fed to comparator 142 through conductor 90. If the hydrocarbons are at a safe level, a false signal is issued by comparator 142 which is fed to inverter 144 which in turn feeds a true signal to AND gate 146. AND gate 146 will also receive a true signal from inverter 158 during the off idle phase of this test. A true output from 146 will then be issued to AND gates 160 and 140. AND gate 160 receives an additional input from latch F1 to indicate whether the carbon monoxide plus oxygen was too high during the idle phase of the test. If it were, repair code 5 requiring that the carburetor must be balanced will be called out on output display 94 when the test is complete (box 5 of FIG. 3A). If latch F1 had not been set, then AND gate 140 will receive a true input through inverter 162 and take this information with information from latch F2 as to whether or not the oxygen level was greater than the carbon monoxide level while the carbon monoxide plus oxygen was below a predetermined maximum at idle (box 60 of FIG. 3A). AND gate 140 will produce a signal calling out repair code 1, requiring an adjustment of the idle air to fuel ratio (box 62 of FIG. 3A). If neither latch F1 or latch F2 had been set, AND gates 140 and 160 will produce false outputs not calling out any repair codes or messages.

If a true signal is issued by comparator 142 indicating high hydrocarbon emissions, a true signal is issued to AND gate 148 which will receive a true signal from inverter 156 during the off idle portion of this test. AND gate 148 will set latch F4 and call out message 4 indicating that the engine failed the hydrocarbon portion of the off idle phase of the test on output display 94, as indicated by block 64 of FIG. 3A. As indicated by block 66 of FIG. 3A, it is determined whether or not flag 3 has been set. The output of AND gate 148 is fed to the combination of AND gates 138 and 134. If flag 3 had been set, AND gate 138 will receive a true signal from latch F3 along with a true signal from AND gate 148, thus issuing a true output which will call into play repair code 3, requiring a low emission tune up, along with message 5 indicating that the engine failed the hydrocarbon portion of the test while also giving a signal to delete messages 3 and 4 (box 68 of FIG. 3A). If flag 3 had not been set, AND gate 134 will receive a true signal from inverter 136 and from AND gate 148, thus issuing an output calling up repair code 4 requiring further diagnostic steps on output display 94 as illustrated by box 70 of FIG. 3A.

An additional circuit such as a NOR gate (not shown) within output display 94 will determine whether or not any messages have been selected throughout both phases of the test as illustrated by box 72 of FIG. 3A. If any messages had been selected, then these messages to display 94 are displayed. If no messages has been selected, then message 0 indicating that the engine has passed all tests will be printed out when the final output is called out of display 94.

In the preceding figures the present invention has been illustrated in the form of one embodiment illustrating a test procedure to determine carbon monoxide and hydrocarbon emissions and isolating the fault or cause of the excessive emissions. While the foregoing specification describes in detail only one embodiment of the present invention, it is to be understood that the present invention is not to be limited thereto but only by the scope of the following claims.

What is claimed is:

1. In combination:
   a hydrocarbon combustor with a fuel inlet means, an air intake means and an exhaust means, said combustor having an idle state and an off idle state;
   analyzer means associated with said exhaust means for measuring carbon monoxide content, hydrocarbon content, and oxygen content of said exhaust means and producing a first, second and third signal respectively proportionate thereto;
   response means connected to said analyzer means for producing, while said hydrocarbon combustor is in said idle state, a first output when said first signal exceeds a predetermined maximum, a second output when said second signal exceeds a second predetermined maximum while said first signal plus said third signal exceeds a third predetermined maximum, a third output when said second signal exceeds said second predetermined maximum while said first signal plus said third signal is not greater than said third predetermined maximum and said first signal is greater than said third signal, and a fourth output when said second signal exceeds said second predetermined maximum while said first signal plus said third signal is not greater than said third predetermined maximum and said third signal is greater than said first signal; said response means further producing, while said hydrocarbon combustor is in said off idle state, a fifth output when said first signal exceeds a fourth predetermined maximum, a sixth output when said second signal is below a fifth predetermined maximum while said second output is present, a seventh output when said second signal is below said fifth predetermined maximum while said fourth output is present, an eighth output with a ninth output when said signal output exceeds said fifth predetermined maximum while said second output is absent and a tenth output when said second signal exceeds said fifth predetermined maximum while said second output is present; and
   display means connected to said response means for displaying information according to said first, second, third, fourth, fifth, sixth, seventh, eighth, ninth, and tenth outputs.

2. The combination of claim 1 wherein said display means displays additional information whenever said first, second, third, fourth, fifth, sixth, seventh, eighth, ninth and tenth outputs are absent.

3. The combination according to claim 1 wherein said analyzer means comprises:
   first measuring means connected to said exhaust means for measuring a carbon monoxide content and producing a first signal proportionate thereto;
   second measuring means connected to said exhaust means for measuring a hydrocarbon content and producing a second signal proportionate thereto; and
   third measuring means connected to said exhaust for measuring an oxygen content and producing a third signal proportionate thereto.

4. The combination according to claim 1 wherein said response means comprises a microprocessor.

5. The combination according to claim 1 wherein said display means comprises a cathode ray tube.

6. The combination of claim 1 wherein said display means comprises a series of lights.

7. An apparatus for measuring hydrocarbon and carbon monoxide emissions exhausted from an internal combustion engine having a fuel inlet, an air intake and an exhaust means, the engine having an idle state and an off idle state, said apparatus comprising:
   analyzer means associated with said exhaust means for measuring a carbon monoxide content of said exhaust and producing a first signal proportionate thereto, for measuring a hydrocarbon content of said exhaust and producing a second signal proportionate thereto, and for measuring an oxygen content of said exhaust and producing a third signal proportionate thereto;
   response means connected to said analyzer means for producing while said hydrocarbon combustor is in said idle state a first output when said first signal exceeds a predetermined maximum, a second output when said second signal exceeds a second predetermined maximum while said first signal plus said third signal exceeds a third predetermined maximum, a third output when said second signal exceeds said second predetermined maximum while said first signal plus said third signal is not greater than said third predetermined maximum and said first signal is greater than said third signal, and a fourth output when said second signal exceeds said second predetermined maximum while said first signal plus said third signal is not greater than said third predetermined maximum and said third signal is greater than said first signal;
   said response means further producing, while said hydrocarbon combustor is in said off idle state, a fifth output when said first signal exceeds a fourth predetermined maximum, a sixth output when said second signal is not greater than a fifth predetermined maximum while said second output is present, a seventh output when said second signal is not greater than said fifth predetermined maximum and said fourth output is present, an eighth output with a ninth output when said second signal exceeds said fifth predetermined maximum while said second output is absent, a tenth output when said second signal exceeds said fifth predetermined maximum while said second output is present, an eleventh output when said first, second, third, fourth, fifth, sixth, seventh, eighth, ninth, and tenth outputs are not produced; and
   display means connected to said response means for displaying information responsive to said outputs.

8. The apparatus according to claim 7 wherein said analyzer means comprises:
   first measuring means connected to said exhaust means for measuring a carbon monoxide content and producing a first signal proportionate thereto;
   second measuring means connected to said exhaust means for measuring a hydrocarbon content and producing a second signal proportionate thereto; and third measuring means connected to said exhaust means for measuring an oxygen content and producing a third signal proportionate thereto.

9. The apparatus according to claim 7 wherein said display means comprises a cathode ray tube.

10. The apparatus according to claim 7 wherein said display means comprises a series of lights.

11. The combination according to claim 7 wherein said response means comprises a programmable microprocessor.

12. The combination according to claim 7 wherein said response means comprises a non-programmable microprocessor.

13. A fault analyzer for testing an internal combustion engine with an idle state and an off idle state, a gas analyzer for measuring a carbon monoxide content, a hydrocarbon content, and an oxygen content in the exhaust of the internal combustion engine, and a means for displaying faults, said fault analyzer comprising:
 first means connected to said gas analyzer for producing a first output when the engine is in the idle state and the carbon monoxide content exceeds a predetermined maximum, and a second output when the engine is in the off idle state and the carbon monoxide content exceeds said predetermined maximum;
 second means connected to the gas analyzer for producing a third output when the engine is in the idle state and the carbon monoxide content is greater than the oxygen content, the oxygen content plus the carbon monoxide content is not greater than a second predetermined maximum, the hydrocarbon content exceeds a third predetermined maximum;
 third means connected to the gas analyzer for producing a fourth output when the engine is in the idle state and the oxygen content is greater than the carbon monoxide content, the oxygen content plus the carbon monoxide content does not exceed said second predetermined maximum, the hydrocarbon content exceeds said third predetermined maximum;
 fourth means connected to the gas analyzer for producing a fifth output when the engine is in the idle state and the carbon monoxide content is greater than the oxygen content, the oxygen content plus the carbon monoxide content does not exceed said second predetermined maximum, the hydrocarbon content exceeds said third predetermined maximum;
 fifth means connected to the gas analyzer for producing a sixth output when the engine is in the off idle state and the oxygen content plus the carbon monoxide content are greater than said second predetermined maximum, the hydrocarbon content is greater than said third predetermined maximum;
 sixth means for producing a seventh output when the engine is in the idle state, the carbon monoxide content plus the oxygen content are greater than said second predetermined maximum and the hydrocarbon content is greater than said third predetermined maximum;
 seventh means for producing an eighth output when the engine is in the off idle state and the hydrocarbon content is greater than said third predetermined maximum;
 eighth means connected to the gas analyzer for producing a ninth output when the engine is in the off idle state and said third output is produced, said seventh output is not produced, and said hydrocarbon content does not exceed said third predetermined maximum;
 ninth means connected to the gas analyzer for producing a tenth output when the engine is in the off idle state, said seventh output is not produced and said hydrocarbon content does not exceed said third predetermined maximum;
 tenth means connected to the gas analyzer for producing an eleventh output when the engine is in the off idle state and the hydrocarbon content is not greater than said third predetermined maximum and the carbon monoxide content is not greater than said first predetermined maximum when the engine is in the idle state;
 eleventh means connected to said first, second, third, fourth, fifth, sixth, seventh, eighth, ninth and tenth means and to said means for displaying faults for producing fault information in response to said first, second, third, fourth, fifth, sixth, seventh, eighth, ninth, tenth and eleventh outputs.

14. A method for distinguishing ignition faults and carburetor faults in an internal combustion engine having an exhaust, said method including the steps of:
 operating the engine at an idle speed;
 measuring the carbon monoxide content of the exhaust;
 producing one output if the carbon monoxide content is greater than a first predetermined maximum;
 measuring the hydrocarbon content of the exhaust;
 measuring the carbon monoxide content plus the oxygen content when the hydrocarbon content is greater than a second predetermined maximum;
 producing a second output when the carbon monoxide content plus oxygen content exceeds a third predetermined maximum, a third output when the carbon monoxide content is greater than the oxygen content while the carbon monoxide content plus the oxygen content is not greater than said third predetermined maximum, and a fourth output when the oxygen content is greater than the carbon monoxide content while the carbon monoxide content plus the oxygen content is less than said third predetermined maximum;
 operating the engine at an off idle speed;
 measuring the carbon monoxide content of the exhaust
 producing a fifth output when the carbon monoxide content exceeds a fourth predetermined maximum;
 measuring the hydrocarbon content of the exhaust;
 producing a sixth output when the hydrocarbon content is not greater than a fifth predetermined maximum and the carbon monoxide content plus the oxygen content exceeds said third predetermined maximum while the engine operates at said idle speed;
 producing a seventh output when the hydrocarbon content is not greater than said fifth predetermined maximum and while the engine operates at idle speed the oxygen content is greater than the carbon monoxide content, the carbon monoxide content plus the oxygen content is below said third predetermined maximum and the hydrocarbon content is greater than said second predetermined maximum;
 producing an eighth output when the hydrocarbon content is not greater than said fifth predetermined maximum and while the engine operates at idle speed, the carbon monoxide content is greater than the oxygen content, the carbon monoxide content plus said oxygen content is less than said third predetermined maximum, and the hydrocarbon content is greater than said second predetermined maximum;

producing a ninth output when the hydrocarbon content is greater than said fifth predetermined maximum and, while the engine operates at said idle speed, said third output is not produced; and producing a tenth output when the hydrocarbon content is greater than said fifth predetermined maximum and, while the engine operates at said idle speed, said third output is produced.

15. The method according to claim 14 including the additional step of producing an eleventh output whenever said first, second, third, fourth, fifth, sixth, seventh, eighth, ninth, and tenth outputs are absent.

16. An apparatus for determining the efficiency of a hydrocarbon combustor having an exhaust, said apparatus comprising:
   analyzer means for measuring the carbon monoxide content and the oxygen content in the exhaust of the hydrocarbon combustor;
   response means for producing a first output when said oxygen content plus said carbon monoxide content exceeds a predetermined maximum and the oxygen content is greater than the carbon monoxide content, a second output when said carbon monoxide content plus oxygen content exceed said predetermined maximum and said carbon monoxide content is greater than said oxygen content, and a third output when said carbon monoxide content plus said oxygen content is less than said predetermined maximum;
   display means connected to said response means for displaying information corresponding to said first, second and third output.

17. An apparatus according to claim 16 wherein said response means comprises a microprocessor.

18. An apparatus according to claim 16 wherein said display means comprises a cathode ray tube.

19. An apparatus according to claim 16 wherein said display means comprises a series of lights.

20. An apparatus according to claim 16 wherein said analyzer means comprises:
   a first means for measuring the carbon monoxide content in the exhaust of the hydrocarbon combustor; and
   a second means for measuring the oxygen content in the exhaust of the hydrocarbon combustor.

21. A method for distinguishing ignition and carburetor faults in an internal combustion engine, said method including the steps of:
   setting limits for carbon monoxide, hydrocarbon and oxygen plus carbon monoxide;
   operating the engine at idle speed;
   measuring a carbon monoxide content in the exhaust of said engine;
   generating an adjust idle air to fuel ratio message whenever said carbon monoxide content in said exhaust exceeds a first predetermined maximum;
   measuring a hydrocarbon content in said exhaust;
   measuring a carbon monoxide plus oxygen content in said exhaust;
   generating a second message indicating probable carburetor imbalance whenever said hydrocarbon content exceeds a second predetermined maximum and said carbon monoxide plus oxygen content is greater than a third predetermined maximum;
   measuring an oxygen content in said exhaust;
   generating a third message indicating probable ignition failure at idle whenever said hydrocarbon content exceeds said second predetermined maximum and said carbon monoxide plus oxygen content is not greater than said third predetermined maximum while said carbon monoxide content is greater than said oxygen content;
   generating a fourth message indicating probable excess leanness at idle whenever said hydrocarbon content exceeds said second predetermined maximum and said carbon monoxide plus oxygen content is not greater than said predetermined maximum while said oxygen content is greater than said carbon monoxide content;
   operating the engine at an off idle speed;
   measuring said carbon monoxide content in said exhaust;
   generating a fifth message indicating that a carburetor overhaul is required whenever said carbon monoxide content exceeds a fourth predetermined maximum;
   measuring said hydrocarbon content in said exhaust;
   generating a sixth message indicating that carburetor must be balanced whenever said hydrocarbon content is not greater than a fifth predetermined maximum and said second message is present;
   generating a seventh message indicating that air to fuel ratio must be adjusted whenever said hydrocarbon content is not greater than said fifth predetermined maximum and said second message is absent while said fourth message is present;
   generating an eighth message indicating probable ignition failure off idle with a ninth message indicating further diagnostic steps are necessary whenever said hydrocarbon content is greater than said fifth predetermined maximum and said third message is present; and
   generating a tenth message indicating that an engine tune up is needed whenever said hydrocarbon content is greater than said fifth predetermined maximum and said third message is absent.

* * * * *